United States Patent Office 3,101,599
Patented Aug. 27, 1963

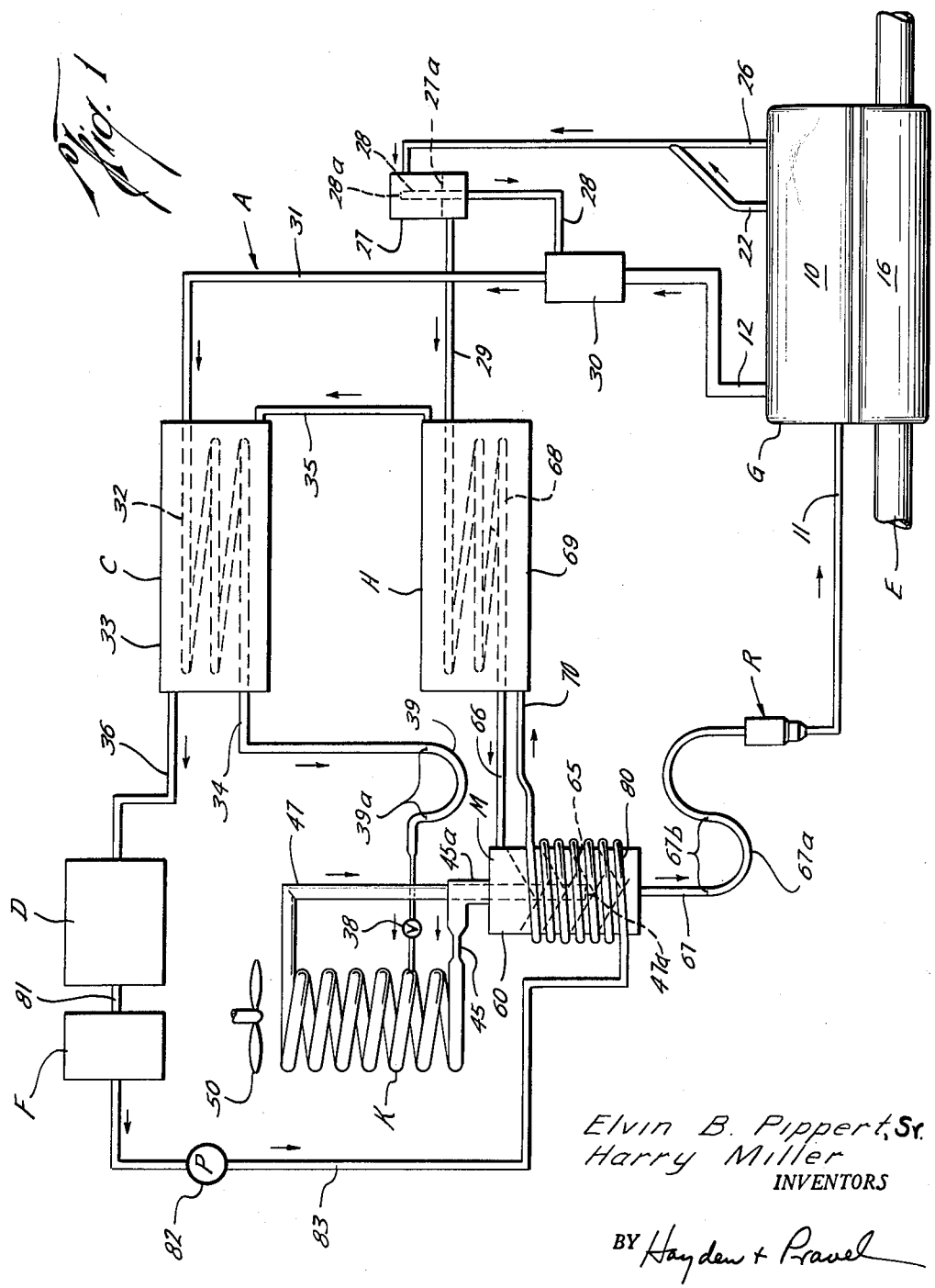

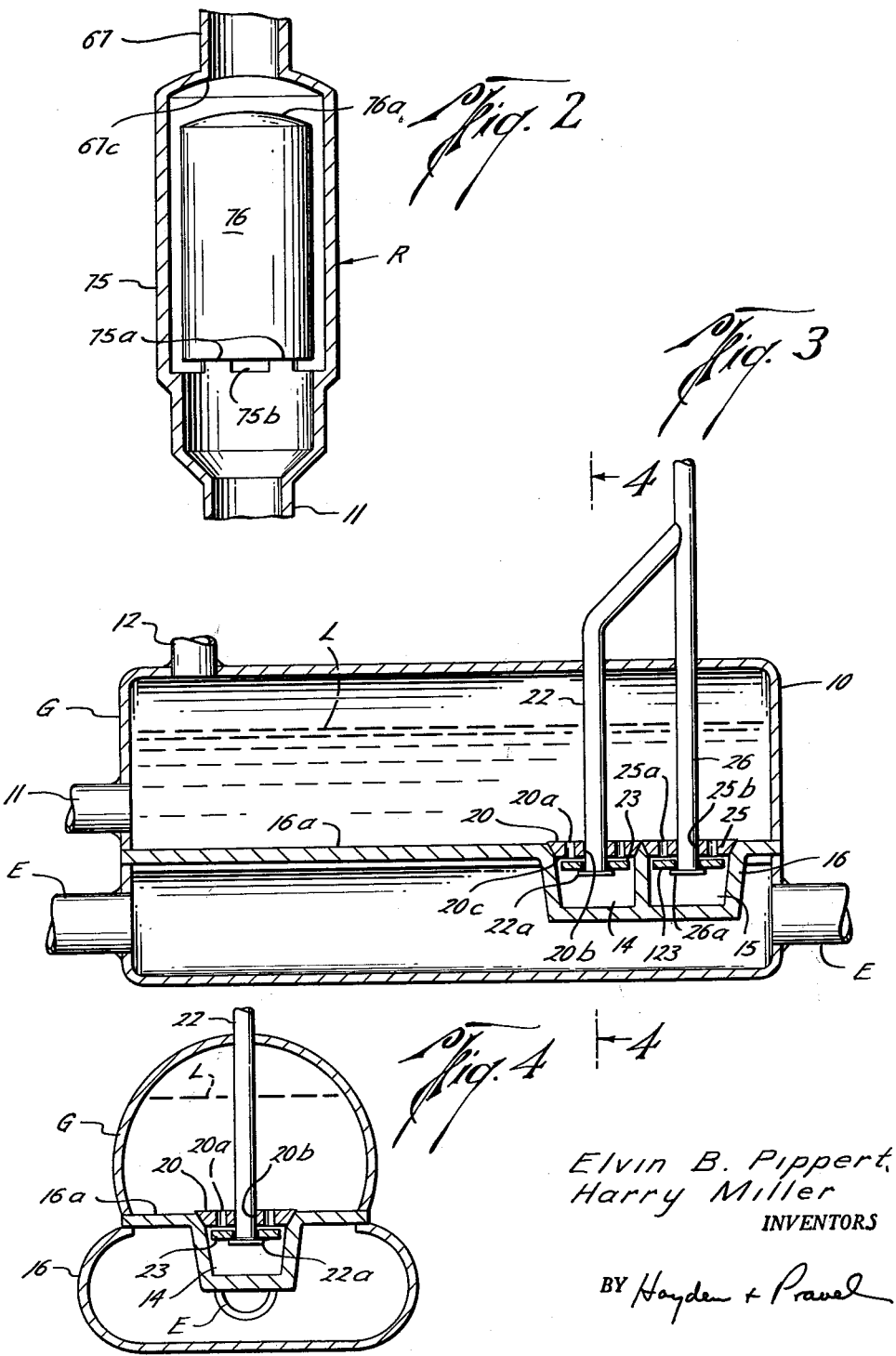

3,101,599
AIR CONDITIONER
Elvin B. Pippert, Sr., and Harry Miller, Houston, Tex.;
said Miller assignor to said Pippert
Filed June 15, 1961, Ser. No. 117,227
1 Claim. (Cl. 62—238)

This invention relates to new and useful improvements in air conditioners, and particularly air conditioners adapted to be used in conjunction with automobiles and other units having internal combustion engines.

An object of this invention is to provide a new and improved air conditioner for cooling an automobile or the like, wherein such conditioner is operated by utilizing the waste heat from an internal combustion engine.

An important object of this invention is to provide a new and improved cooling unit which has a minimum of working parts and which is inexpensive, efficient and compact so that it is particularly suitable for use in the smaller or compact cars.

Another object of this invention is to provide a new and improved cooling unit for automobiles and the like wherein the refrigerant is circulated in an absorption cycle, and wherein a generator for converting the refrigerant from a liquid into a gas in the cycle receives heat from the exhaust gases of an internal combustion engine, whereby the energy for the unit is supplied from such exhaust gas heat which would otherwise be wasted.

A particular object of this invention is to provide a new and improved air conditioner for cooling an automobile or similar vehicle wherein such air conditioner operates without a compressor for the refrigerant and also operates without increasing the load on the engine of the automobile or other vehicle.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 1 is a schematic view illustrating the air conditioner or cooling apparatus of this invention;

FIG. 2 is a view, partly in elevation and partly in section illustrating one type of check valve which is adapted to be used in conjunction with the air conditioner as shown in FIG. 1;

FIG. 3 is a view, partly in section and partly in elevation illustrating the details of one type of generator adapted to be used in conjunction with the air conditioner shown in FIG. 1; and FIG. 4 is a sectional view taken on line 4—4 of FIG. 3 to further illustrate the generator of this invention.

In the drawings, the letter A designates generally the air conditioner apparatus of this invention. The apparatus A of this invention is particularly suitable for use in the cooling of the enclosure within an automobile. Such apparatus A operates without the use of the conventional compressor and employs the heat from the exhaust gases of the internal combustion engine of the automobile or other vehicle for activating the system, as will be more fully explained. Therefore, with the present invention, the heat from the exhaust gases, which would otherwise be completely wasted, is utilized.

Considering now the invention in detail, such apparatus or air conditioner A of this invention includes a generator G which is preferably mounted on or attached to an exhaust pipe E of an automobile or other vehicle having an internal combustion engine or the like. In the preferred form of the invention, the generator G (FIGS. 1, 3 and 4) includes a tank or vessel 10 which is adapted to have a liquid which is indicated in FIG. 3 at the level L therein. As will be more fully explained hereinafter, such liquid L in the generator G is the weak or dilute solution of the refrigerant, which would preferably be a weak or dilute ammonia solution. Such ammonia solution or other liquid refrigerant enters the vessel 10 through an inlet opening 11. The vessel 10 of the generator G has an outlet tube or pipe 12 connected thereto above the level L of the liquid refrigerant so that the gaseous refrigerant may flow or move from the vessel 10 through the line 12, as will be explained. Under normal conditions of operation, the tank 10 has gaseous refrigerant present therein above the level L of the liquid refrigerant.

In connection with the apparatus of this invention it is also necessary or desirable to force some of the weak refrigerant liquid from the vessel 10 through the system for a purpose that will be evident hereinafter. With the present invention, the forcing of the weak solution of the ammonia or other liquid refrigerant is accomplished in the generator G by the provision of pressure chambers 14 and 15. Such chambers 14 and 15 are provided in a chamber housing 16 which is welded or otherwise secured so as to form the lower portion of the vessel 10. The housing 16 is preferably connected at an intermediate section of the exhaust pipe E of the vehicle (FIG. 3). Preferably, the housing 16 is formed of steel as is the vessel 10, both of which are suitably welded, or otherwise connected together and to the exhaust pipe E. Therefore, the heat from the gases passing through the exhaust pipe E is transmitted to the liquid in the vessel 10 by the conducting of the heat through the housing 16 and the walls of the chambers 14 and 15.

The chambers 14 and 15 are exposed to the heat from the exhaust pipe E on three sides (FIG. 4) in the preferred form of the invention so that they get a super heat. The chamber 14 is in communication with the interior of the vessel 10 through one or more openings 20a formed in a closure plate 20 mounted at the upper end of the chamber 14. The closure 20 is preferably welded on its external edges of the upper plate 16a of the housing 16, but it may be attached in any other suitable way. The closure 20 also has a central opening 20b through which an outlet fluid tube 22 formed of steel or other suitable material is mounted. Such tube 22 has a lower outwardly extending annular flange 22a which is below the lower surface of the closure 20 and which has a valve ring 23 loosely mounted thereon. Such valve ring 23 is of a thickness less than the distance from the flange 22 to the lower surface 20c of the closure 20 so that it can move up and down between the flange 22a and the lower surface of the closure 20. Thus, fluid may enter the chamber 14 through the ports 20a when the valve ring 23 is in its lower position as shown in FIG. 3, but when a gas pressure is developed within the chamber 14 due to the heating of the liquid therein, the valve ring 23 then moves upwardly into contact with the surface 20c and closes the ports 20a. As will be explained in connection with the operation of the apparatus A of this invention, the liquid which is in the chamber 14 is forced upwardly with the development of the gas pressure therein so that the liquid flows upwardly through the tube 22. The valve 23 prevents the flow of the liquid outwardly back into the vessel 10 when the gas pressure seats the valve 23 in its upper position. When the gas pressure drops in the chamber 14, the valve ring 23 again drops back to its lower position and more of the liquid from the vessel 10 enters the chamber 14 until the gas pressure is again built up. This cycle continues and therefore there is an intermittent but substantially continuous flow of liquid from the chamber 14 upwardly through the tube 22 when sufficient heat is being supplied from the exhaust line E.

The chamber 15 operates in the same manner and preferably is a duplicate of the chamber 14. A closure 25 which corresponds with the closure 20 is provided and it has openings 25a therethrough. The closure 25 is welded or otherwise secured to the plate 16a at the upper end of the chamber 15 so as to close the upper end of such chamber 15, with the exception of the ports 25a. A pipe or tube 26 extends downwardly through a central opening 25b in the closure 25 in the same manner as the tube or pipe 22 extends through the closure 20. The pipe or tube 26 has a lower outwardly extending flange 26a which holds an annular ring valve 123 for movement in the same manner as previously explained in connection with the valve 23. Thus, the valve 123 controls the flow of the liquid through the ports 25a into the chamber 15 in the same manner as the valve 23 controls the flow of the liquid into the chamber 14. Thus, liquid is forced by the gas pressure developed in the chamber 15 upwardly through the tube or pipe 26 for a purpose to be more fully evident from the following description. It is to be noted that the pipe 22 actually connects into the pipe 26 so that the liquid flowing upwardly through the two pipes 22 and 26 merge and flow together through the tube 26.

The tube 26 has its upper end entering into a separation tank or chamber 27 (FIG. 1). Such separator 27 may be formed in various ways, but as illustrated in FIG. 1, it includes a closed cylindrical tank having a pipe 28 extending upwardly in the vessel 27. The upper end 28a of the pipe 28 is open so that free gas may pass into the pipe 28. The liquid is retained in the separator 27 at a level indicated at 27a. Thus, the liquid which passes upwardly to the separator 27 from the line 26 is separated into the gaseous component and the liquid component, with the gaseous component flowing through the line 28 and the liquid component collecting in the chamber 27 for discharge through a line 29.

The gas in the line 28 enters into a mixing tank or chamber 30 which also receives the gas from line 12. Thus, all of the gaseous refrigerant, which in the present case is gaseous ammonia enters into the chamber 30 and is mixed before passing on from the chamber 30 into line 31.

The line 31 is connected to a coil of pipe 32 which is disposed in a condenser C. The condenser C is made in a conventional way and is provided with an external casing or housing 33 in which the coil 32 is positioned. The coil 32 is connected to an outlet line 34 from the condenser C so that the gas which enters the condenser C through line 31 is cooled to a sufficient extent to liquefy same by the time it is discharged out through line 34. The cooling of the liquid or gas in the line 32 is preferably accomplished by the introduction of cooling water through line 35 into the casing or housing 33. The cooling water then flows around the coils 32 and out of the casing or housing 33 through an outlet line 36. The cooling water of course is maintained separately from the gaseous and liquid refrigerant in the coil 32 as will be understood since this is a heat exchanger type of condenser.

The liquid refrigerant, which is preferably liquid ammonia, flows through the line 34 to an expansion valve 38, or any suitable orifice opening which is restricted so as to permit the expansion of the liquid into an evaporator coil K for effecting a cooling refrigerant action. As is well understood in the art of refrigeration, the expansion of the liquid to the gaseous state requires the heat of expansion and such heat is taken from the surrounding area around the coil K so that a cooling action is thus obtained in the area surrounding such coil K. The cool air surrounding the coil K is constantly circulated within the area being cooled by means of a fan 50 or other suitable blower arrangement as will be well understood. Thus, when the present invention is employed within the body of an automobile or similar vehicle, the coil K and the fan 50 are located within such body or enclosure of the automobile or vehicle and the air is forced across the cooling coil K so as to cool the body or enclosure of the vehicle or automobile.

It is to be noted that there is a liquid trap 39 provided in the line 34 prior to the orifice 38 so as to prevent any back-flow of gaseous refrigerant through the line 34 after it has expanded into coil K. The height of the liquid in the trap 39 is indicated at 39a.

At the lower end of the coil K, a carrier gas, preferably hydrogen, is introduced through an inlet line 45 so that it mixes with the ammonia gas and serves as a carrier for the ammonia gas as it moves through the coil K. The combined hydrogen and ammonia gases are discharged from the coil K through a common line 47.

The line 47 extends downwardly into an absorption unit M so that the lower end 47a thereof is well below the upper end of the tank or chamber 60 of the unit M. The line 45 is connected to the upper end of the chamber 60 by an elbow 45a or any other suitable connection, and preferably, the tube 47 passes through the elbow 45 and is of a smaller diameter so that gas may pass around the tube 47 and into the elbow 45a and the line 45 from the chamber 60. It will be appreciated of course that the line 47 may enter the upper end of the chamber 60 separately from the elbow 45a of the line 45, and the illustrated construction of FIG. 1 is merely a preferred form of the invention. In any event, the gases in the line 47 are directed all of the way to the lower end 47a thereof which is open and such gases then flow into the inside of the chamber 60. The chamber 60 is formed with diagonally positioned trays 65 as indicated in FIG. 1 so that a liquid introduced into the upper end of the chamber 60 through the line 66 is adapted to flow downwardly from the upper tray 65 to the next lower tray and consecutively on down to the lower end of the chamber 60 for discharge through line 67. Such liquid 66 is a weak solution of the ammonia refrigerant in the preferred form of the invention and it is supplied from a heat exchanger H which has a coil 68 therein. The coil 68 is provided with connections to the line 29 and the line 66 so that the liquid from the line 29 flows through the coil 68 and out through the line 66 as indicated by the arrows in FIG. 1. The heat exchanger H has an outer housing or casing 69 into which cooling water is fed through line 70. The cooling water circulates around and separately from the coil 68 and is discharged outwardly through the line 35 for flow to the condenser C. As previously noted, the cooling fluid is water which would come from the water system of the vehicle or internal combustion engine with which the present cooling unit is used, as will be more fully explained.

The trays 65 have perforations or holes therethrough so that the cooled weak ammonia solution entering the chamber 60 through the line 66 flows downwardly on the inclined trays 65 and drips through the holes therein in a known manner so that the ammonia gas which is released from the lower end of the tube 47 mixes with the weak ammonia solution and picks up or absorbs the ammonia gas in the liquid for discharge through the line 67. The carrier gas, which is preferably hydrogen, is not absorbed by the ammonia solution and therefore it is released and moves to the upper end of the chamber 60 and out through the elbow or pipe 45a and then into the line 45 for flow to the evaporator coil K.

The line 67 has a liquid trap 67a therein which collects fluid at the level 67b as indicated in FIG. 1. The level of the liquid may of course vary, but with the liquid trap 67a, any of the gases developed in the generator G are prevented from flowing backwardly into the absorber unit M.

The line 67 is connected with the flow line 11 and a check valve R is provided between the lines 67 and 11 to prevent flow backwardly through the line 11 into the line 67. A typical check valve R which may be used is illustrated in FIG. 2 wherein the valve housing is designated with the numeral 75 the upper end of the valve housing is of course in communication with the line 67 and the lower end of the valve housing is in communication with the line 11. The housing 75 has a movable float or valve member 76 within the housing 75 which is normally adapted to seat on spaced upright supports 75a which have spaces 75b therebetween. The valve member 76 is preferably cylindrical except that its upper portion 76a is usually curved to provide for a seating surface which is adapted to seat on the lower end 67c of the tube 67 to close fluid flow from the chamber 75 into the pipe or tube 67 when the fluid pressure in the upward direction towards the pipe 67 reaches a predetermined amount sufficient to raise the valve member 76 to its upper seated position. Normally, the flow of liquid from the line 67 to the line 11 will maintain the valve member 76 in a position shown in FIG. 2 so that the liquid can flow through the check valve R without interruption or obstruction.

As previously pointed out, the air conditioner or cooling unit A of this invention is adapted to be used with an internal combustion engine. Since such engines normally are cooled with a circulating water system, the present unit A is adapted to utilize that cooling water from the internal combustion engine for the cooling of the heat exchanger H and the condenser C. Also, there is a coil 80 externally of the chamber 60 of the absorption unit M which is provided for cooling the unit M. As illustrated in FIG. 1, the cooling liquid of the internal combustion engine passes from the line 36 to the internal combustion engine D. The internal combustion engine D is connected with the usual radiator F through any suitable line 81 so that the fluid such as the cooling water flows from the internal combustion engine D to the radiator F for cooling. The water is cooled in the radiator F and is then pumped with the usual water pump 82 through the line 83 to the coil 80 on the absorption unit M. Various other arrangements for the cooling water system may of course be employed and it may be entirely separate from the internal combustion engine D if desired. However, if the internal combustion engine water system is employed for the cooling of the various parts of the present invention A, then the same pump which is used in the internal combustion engine may be used at 82, thereby eliminating the necessity for an additional pump for circulating the cooling water in the unit A of this invention.

In the operation or use of the air conditioning or cooling unit A of this invention, the cooling coil K is normally placed in the enclosure to be cooled. It of course is possible to position the cooling coil K at a point which is remote from the enclosure so long as there is communication between the enclosure and the cooling coil K. In any event, the fan 50 blows the air across the coil K and blows the cool air surrounding the coil K into the enclosure to cool same in the known manner. The rest of the apparatus or unit A may of course be positioned in any suitable part of the vehicle, but preferably, the rest of the apparatus would be located forwardly of the fire wall of the automobile or vehicle.

As previously pointed out in connection with the description of the parts of the unit A, the unit A has three systems, namely, the refrigerant system, the gas carrier system, and the cooling fluid system. In the preferred form of the invention, wherein ammonia is employed as the refrigerant, the refrigerant system or phase of the cycle is divided into the strong or concentrated ammonia liquid, the weak or dilute ammonia liquid, and the gaseous ammonia. Starting with the generator, which has the weak or dilute ammonia solution therein as previously explained, the gaseous refrigerant is produced and is discharged through the line 12 and also the liquid is caused to flow from the generator G through the lines 22 and 26 to the separator 27. The heat for causing the production of the gaseous refrigerant and the flow of the liquid refrigerant from the generator G is supplied in the preferred form of the invention by the heat from the exhaust gases of the internal combustion engine or a similar engine in connection with the vehicle with which the present unit A is used. As previously explained, the liquid and gaseous ammonia are separated in the separator 27 with the gaseous refrigerant passing to the mixing chamber 30 through the line 28 and with the liquid weak ammonia solution passing through the line 29 to the heat exchanger H and then to the absorbing unit M. A gaseous refrigerant flows to the condenser C through the line 31 and is formed into a liquid concentrated or strong ammonia solution which then flows through line 34 and orifice 38 into the evaporator coil E where the expansion of the refrigerant takes place to effect the cooling at the coil K. The gaseous ammonia in the coil K is mixed with the hydrogen circulating therein and flows downwardly through the line 47 to the absorbing unit M. In the absorbing unit M, the hydrogen and the gaseous ammonia are separated from each other so that the hydrogen returns in its cycle back to the coil K and the gaseous ammonia is absorbed by the weak or dilute ammonia solution from the line 66 as the weak solution passes down through the trays 65. The ammonia solution passing from the lower end of the tank 60 into the line 67 is stronger in concentration than the ammonia solution which enters the chamber 60 from the line 66, but the strength of the solution in the line 67 is still not as great as that which ultimately flows to the evaporator coil K through the orifice valve or opening 38.

The cooling fluid may be supplied from any suitable source or system, but as previously pointed out, it is preferred to provide the cooling of the unit A by means of the cooling water from the internal combustion engine or other engine in connection with the automobile or vehicle being cooled by the unit A. Thus, as previously noted, the cooling water from the internal combustion engine is preferably circulated from the pump 82 through the coil 80, heat exchanger H, and condenser C back to the engine D and the radiator F.

The foregoing disclosure and description of the invention is illustrative and explanatory thereof and various changes in the size, shape and materials, as well as in the details of the illustrated construction, may be made within the scope of the appended claim without departing from the spirit of the invention.

What is claimed is:

An air conditioner for use in conjunction with the exhaust gas of an internal combustion engine, comprising an evaporator coil adapted to receive gaseous refrigerant therein, a generator adapted to convert liquid refrigerant into gaseous refrigerant, a heat exchanger for liquefying the gaseous refrigerant, means for conveying the refrigerant to the heat exchanger and then to the evaporator coil, means for expanding the refrigerant into a gaseous form as it enters said evaporator coil, separator means for separating liquid from said gaseous refrigerant discharged from said generator to provide an absorbing liquid, an absorber unit adapted to have the absorbing liquid circulated therethrough for absorbing the gaseous refrigerant from said evaporator, means for returning the refrigerant to said absorber unit from said evaporator coil for absorption by the absorbing liquid, means to direct the absorbing liquid and refrigerant therewith to said generator, and means attaching said generator to an exhaust line of an internal combustion engine for transmitting heat from the exhaust line to said generator, said generator having a pressure chamber therein for receiving successive portions of liquid refrigerant for forming a liquid and vapor mixture, valve means for closing off such mixture in said pressure chamber from the rest of the generator, and outlet tube means connected to said pressure chamber and said separator for the flow of said liquid and vapor mixture from said pressure chamber to said separator when said valve means is closed.

References Cited in the file of this patent

UNITED STATES PATENTS

| | | |
|---|---|---|
| 2,269,099 | Grubb | Jan. 6, 1942 |
| 2,287,172 | Harrison et al. | June 23, 1942 |
| 2,430,047 | Edberg | Nov. 4, 1947 |
| 2,659,214 | Coggburn | Nov. 17, 1953 |
| 2,953,907 | De Cicco et al. | Sept. 27, 1960 |
| 2,990,694 | Kummerlowe | July 4, 1961 |